(12) United States Patent
De Souza et al.

(10) Patent No.: US 8,006,047 B2
(45) Date of Patent: Aug. 23, 2011

(54) STORAGE DEVICE WITH WRITE BARRIER SENSITIVE WRITE COMMANDS AND WRITE BARRIER INSENSITIVE COMMANDS

(75) Inventors: Jorge Campello De Souza, Cupertino, CA (US); Frank R. Chu, Milpitas, CA (US); Chunqi Han, San Jose, CA (US); Anand Krishnamurthi Kulkarni, San Jose, CA (US); Donald Joseph Molaro, Cupertino, CA (US); Richard M. H. New, San Jose, CA (US); Marco Sanvido, Los Altos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 820 days.

(21) Appl. No.: 11/823,441

(22) Filed: Jun. 27, 2007

(65) Prior Publication Data
US 2009/0006787 A1    Jan. 1, 2009

(51) Int. Cl.
*G06F 12/00* (2006.01)
(52) U.S. Cl. ............................ 711/156; 711/E12.07
(58) Field of Classification Search .................... 711/156
See application file for complete search history.

(56) References Cited

U.S. PATENT DOCUMENTS

| | | |
|---|---|---|
| 6,490,642 B1 * | 12/2002 | Thekkath et al. ............. 711/151 |
| 2005/0149589 A1 | 7/2005 | Bacon et al. |
| 2006/0020766 A1 | 1/2006 | Dussud |
| 2006/0106980 A1 | 5/2006 | Kobayashi et al. |
| 2006/0190510 A1 | 8/2006 | Gabryjelski et al. |
| 2007/0168626 A1 | 7/2007 | De Souza |
| 2007/0203960 A1 | 8/2007 | Guo |

* cited by examiner

*Primary Examiner* — Reginald G Bragdon
*Assistant Examiner* — Hamdy S Ahmed
(74) *Attorney, Agent, or Firm* — G. Marlin Knight

(57) ABSTRACT

The invention is a storage device which implements a write barrier command and provides means for a host to designate other write commands as being sensitive or insensitive to the existence of write barrier commands. The device can optimize the execution of commands by changing the order of execution of write commands that are insensitive to write barrier command. In an embodiment of the invention a flag associated with the write command indicates whether the command is sensitive or insensitive to the existence of write barrier commands. In an embodiment of the invention the write barrier command can be implemented as a write command with a flag that indicates whether the command is a write barrier command. In one embodiment of the invention the queue of commands and data to be written to the media is stored in a non-volatile cache.

15 Claims, 3 Drawing Sheets

STORAGE DEVICE WITH WRITE BARRIER SENSITIVE WRITE COMMANDS AND WRITE BARRIER INSENSITIVE COMMANDS

FIELD OF THE INVENTION

The invention relates to the design and operation of storage devices for use with computers and more particularly to methods for controlling the order and timing of the execution of write commands in relation to write barrier commands.

BACKGROUND

Computers use storage devices such as disk drives for permanently recording data. The computers are typically called "hosts" and the storage devices are called "drives." A host can be connected to multiple drives, but a drive can also be connected to multiple hosts. Commands and data are transmitted to the drive to initiate operations. The drive responds with formatted status, error codes and data as appropriate. Various standard command architectures have been adopted including, for example, Integrated Drive Electronics (IDE), Small Computer System Interface (SCSI) and Serial ATA (SATA).

The host computer can range in size from a supercomputer cluster to a small handheld device. The host can also be special purpose devices such as a digital camera. Similar data storage devices might be used in a variety of applications including personal computers with less stringent demands, as well as large systems used by banks, insurance companies and government agencies with critical storage requirements. Viewed at a high level a computer is typically described as having an operating system which provides basic services to application programs running on the computer. More detailed views can break the processing into multiple processing layers.

A queue of commands for the disk drive may be kept in the drive's memory. A disk drive can use the command queue to optimize the net execution time of commands by changing the order in which they executed. Among other criteria, prior art algorithms use seek time rotational latency to optimize execution time.

U.S. patent application 2006/0106980 by Kobayashi, et al. (published May 18, 2006) a hard disk drive (storage device) that includes a queue capable of storing a plurality of commands, and a queue manager for optimizing the execution order of the plurality of commands on the basis of whether or not the execution of each command requires access to the storage medium.

A disk drive typically includes a high speed cache memory where selected sectors of data can be stored for fast access. Operations performed using only the drive's cache are much faster than those requiring that the arm be moved to a certain radial position above the rotating disk and having to wait for the disk to rotate into proper position for a sector to be accessed. A read cache the cache contains copies of a subset of data stored on the disk. The cache contains recently read data and may also contain pre-fetched sectors that occur immediately after the last one requested. A read command can be satisfied by retrieving the data from the cache when the needed data happens to be in the cache.

The cache can also be used for data that is in the process of being written to the disk. There is a critical window of time in a write operation between placing the data in the cache and actually writing the data to the disk when a power failure, for example, can cause the data to be lost. However, having the host wait until the relatively slow write process has completed can be an unnecessary inefficiency in many cases. The waiting time is justified for some data but not for all data. A so-called fast write operation simply places the data in the write cache, signals the host that the operation is complete and then writes the data to disk at a subsequent time, which can be chosen using optimization algorithms that take into account all of the pending write commands.

Prior art command architectures have provided ways for a host to send a particular command or parameter to the drive to ensure that the data is written to the disk media before the drive signals that the write operation is complete. Writing data on the media is also called committing the data or writing the data to permanent storage. One type of prior art command (cache-flush) directs the drive to immediately write all of the pending data in the cache to the media, i.e., to flush the cache. Flushing the entire cache on the drive may take a significant amount of time and if done too often, reduces the benefit of the cache. Also known in the prior art is a write command with a forced unit access (FUA) flag or bit set. A write with FUA flag set will cause the drive to completely commit the write to non-volatile storage before indicating back to the host that the write is complete.

Efficiencies can also be obtained by rearranging the order in which the commands are executed, but re-ordering of commands inside the drive can also create problems. There is the potential for such write re-ordering to introduce inconsistency in the data structures on disk. File system and data base consistency is guaranteed by the order in which specific writes are written to non-volatile storage. While it is permissible to reorder some writes a partial ordering of writes must be guaranteed.

Write barrier commands are used to aid application programs in ensuring that certain data is physically on the storage media before other data is written to the device. Data consistency is guaranteed by the order in which certain writes occur to the non-volatile media. The write barrier does not explicitly indicate a time at which the write will occur as in cache-flush and FUA commands. A write barrier imposes a partial ordering on the pending writes to the drive. A write barrier can be defined as a special write command or a selectable option in a write command that ensures that the previous write commands are actually written to the media and not simply sitting in the cache. All write commands sent before a write barrier (WB) command must be committed to the media before the WB-command is committed to the media. Additionally, all writes sent after the WB-command must only be committed to the media after the WB-command is committed to the media.

In United States Patent Application 20060190510 by Gabryjelski, et al. (Aug. 24, 2006) a system is described that facilitates the storage of data using a "write barrier component." The system interfaces to a hardware component that stores data, and includes a write barrier component that dynamically employs instructions compatible with the hardware component to ensure data integrity during storage of the data. The write barrier component is independent of the operating system and application programs and can operate in a user mode and/or a kernel mode. A coalescing component combines cache synchronization requests into a single set of instructions to flush the disk cache in one process.

Experiments by the applicants have confirmed that the commonly used Microsoft operating system Windows XP makes frequent use of cache flushing commands to ensure that the file system remains in a consistent state. The experiments also show that the frequent cache flushing results in very low utilization of the cache. For example, with a 16 MB write cache during an observation period more than 70% of the cache flushes occurred when the cache was less than 1% full. A means that allows the cache to be used effectively while allowing critical data to be committed to the media is needed.

SUMMARY OF THE INVENTION

The invention is a storage device which implements a write barrier command and provides means for a host to designate other write commands as being sensitive or insensitive to the existence of write barrier commands. The disk drive can optimize the execution of commands by changing the order of execution of write commands that are insensitive to write barrier command. In an embodiment of the invention a flag associated with the write command indicates whether the command is sensitive or insensitive to the existence of write barrier commands. In an embodiment of the invention commands are grouped into "Re-orderable Command Groups" defined by the write barrier commands. Inside the Re-orderable Command Groups commands can be executed in an order determined by optimization algorithms. In an embodiment of the invention the write barrier command can be implemented as a write command with a flag that indicates whether the command is a write barrier command. In another embodiment of the invention an independent command is used for the write barrier command. In one embodiment of the invention the queue of commands and data to be written to the media is stored in a non-volatile cache.

DETAILED DESCRIPTION OF THE INVENTION

Figure 1:
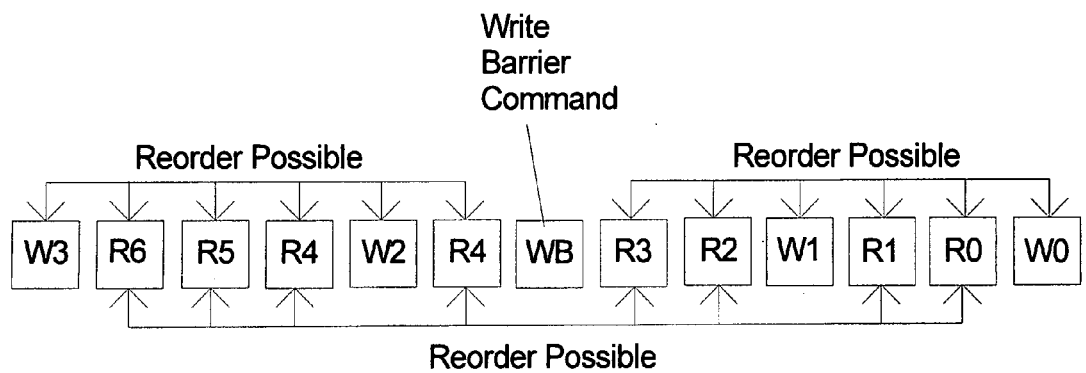
FIG. 1 is an illustration of a prior art command queue in a disk drive. The queue contains a write barrier command.

FIG. 1 will be used to illustrate the limitations of command re-ordering in a prior art implementation of a write barrier command. In the following the write barrier command is assumed to be implemented as an option for a write command, i.e. the write barrier command is a write command with associated data to be written to the disk (media). In an alternative embodiment the write barrier command can be implemented as a separate command. Each of the boxes in FIG. 1 represents a command sent from a host (not shown) to a disk drive (not shown). The W0 command on the far right is the first write command transmitted by the host to the drive. Moving from right to left gives the chronological sequence of the commands. The boxes with "Rn" labels are read commands. The boxes with "Wn" labels are write commands. The write barrier command is labeled "WB."

In FIG. 1, the write barrier command ensures that write commands in the queue before the write barrier (W0 and W1) will be committed to media before the command with the write barrier (WB) and any write commands that follow (W2 and W3) are committed (written) to the media only after the command with the write barrier (WB) has been committed to media. As shown re-ordering of read commands is not restricted by the write barrier command.

Figure 2:
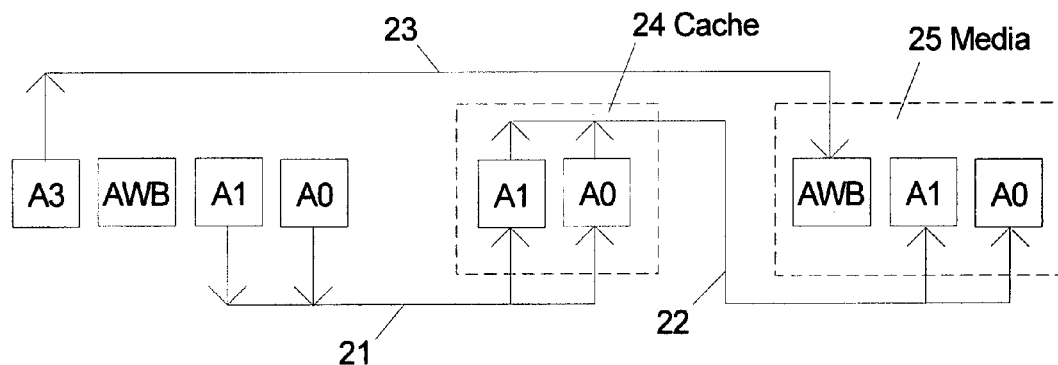
FIG. 2 is an illustration of a prior art command queue in a disk drive having a cache. The queue contains a write barrier command.

One implementation of the write barrier would be to allow for a limited use of the cache 24 as illustrated in FIG. 2. The four commands A0, A1, AWB and A3 are issued by the host in that order. The completion code for the write barrier command (AWB) is not returned to the host system until all previously issued write commands (A0 & A1), and the data with the write barrier command itself is on the media (disk surface). Write commands received following the write barrier command are not committed to media 25 until the write barrier operation has been completed. Commands in the queue before the write barrier are processed, and may be cached. Cached write commands issued by the host before (preceding) the write barrier command may be written to the disk opportunistically according to prior art techniques. Commands in the queue after the write barrier may be cached or held in the queue, but not committed to media until write barrier has been committed to media. This implementation allows for the queuing system to optimize the ordering of the writes, and for the cache to take advantage of rotational position optimization.

Figure 3:
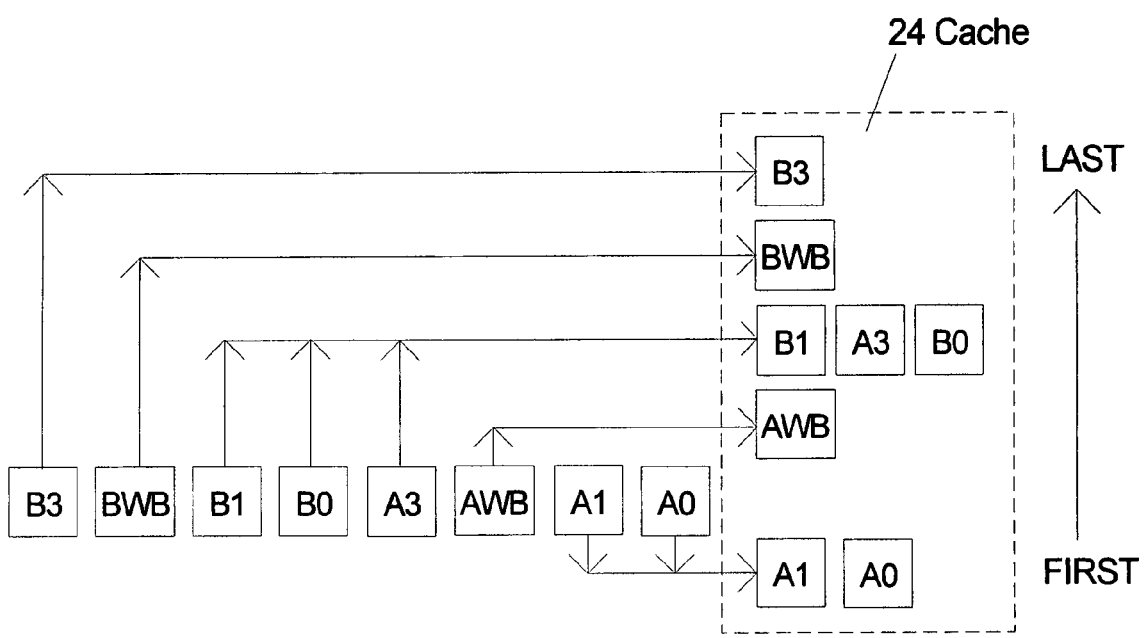
FIG. 3 is an illustration of the re-ordering of a set of write commands using "Re-orderable Command Groups" within the write cache according to the invention.

An optimization of the previous method according to the invention enforces the order in which the writes must occur to the disk media, but not the timing of when the writes will actually take place. One implementation of the write barrier would have the barrier form "Re-orderable Command Groups" within the write cache. The write barrier command defines the boundaries of a Re-orderable Command Group. FIG. 3 illustrates the processing of a set of write commands that have been issued by a host in the order shown on the left side of the figure. The A0 command was the first one issued and the B3 command was the last.

As shown in FIG. 3 write commands A1 and A0 comprise Re-orderable Command Group (RCG) "1" which must be committed to the media before RCG "2" which includes only the AWB write barrier command. Each horizontal group in the cache 24 as shown is an RCG group. The RCG groups must be written to the media starting with group "1" and proceeding sequentially up the queue with group "2" being second and group "5" ("B3") being last.

The cache can be de-staged while respecting the order defined by the write barrier. However, in this embodiment the drive is permitted to choose the time at which the cache is de-staged. So long as each Re-orderable Command Group (RCG) within the cache is written (committed) to the media surface before the next group is allowed to be written (destaged) to media the file system or database will remain in a consistent state. Commands within an RCG may be reordered. Thus, in group "1" either the A0 or A1 write command can be written first. Similarly in group "3" (B1, A3, B0) the individual commands in the group can be written out in any order.

The drive's caching algorithm can determine the order of command execution inside a Re-orderable Command Group (RCG) based on prior art principles. For example, when destaging the 3rd group ("B1", "A3", "B0"), if the actuator is nearer to the sector for "A3" it could be written first, followed by whichever sector was the next nearest. This allows better use of the write cache.

In a specific embodiment of the invention the queue of commands and data to be written to the media are stored in a non-volatile cache. The non-volatile cache may be internal to the disk drive, or it may be located in other parts of the system such as the host.

One embodiment of the invention uses a bit (WB bit) in a device register to signal the write barrier command while another bit is allocated to the designate Forced Unit Access (FUA). FUA is defined in the some prior art architectures as an option for a write command that requires that the associated data be written (committed) to the media before the command is considered complete, i.e., the storage device is required to write the data on the media before returning a completed status code. A FUA write is not the same as a write barrier command because the FUA write does not affect other write commands.

The host signals a write barrier by setting a predetermined flag bit in the device register in a write command such as a Native Command Queuing (NCQ) write command. Native Command Queuing allows the drive to optimize the order in which read and write commands are executed. The use of two bits provides a total of four combinations as shown in Table 1.

TABLE 1

| FUA | WB | DESCRIPTION |
|-----|----|-------------|
| 0 | 0 | Standard Write |
| 0 | 1 | Write Barrier Write, order implied by write barrier enforced |
| 1 | 0 | Standard Write with FUA |
| 1 | 1 | Write Barrier Write, order implied by write barrier enforced. Command completion status not returned to host until data is Written to media |

It is advantageous to allow some write commands to be re-ordered across the write barrier, and other not. The invention allows write commands to be designated as write barrier sensitive or not by the host. Write commands can then be a member of one of two classes: those writes to which the write barrier applies and those to which it does not. This can be implemented through designation of a "barrier sensitivity" bit. These two classes of write commands are called barrier sensitive writes and barrier insensitive writes. An example of insensitive write commands might include memory paging writes.

This embodiment can be implemented by designating a Barrier Sensitivity (BS) bit in a command register as the indicator of Write Barrier Sensitivity. The FUA, WB and BS bits can be implemented in the same design. All write commands with BS=1 sent before a write with WB=1 must be committed to the media before the write with WB=1 is committed to the media. Moreover, all writes with BS=1 sent after the write with WB=1 must only be committed to the media after the write with WB=1 is committed to the media.

Writes that have the barrier sensitive bit set must not cross a write with the write barrier option set, but barrier insensitive writes may be reordered across the write barrier in the same manner as read commands.

Figure 4:
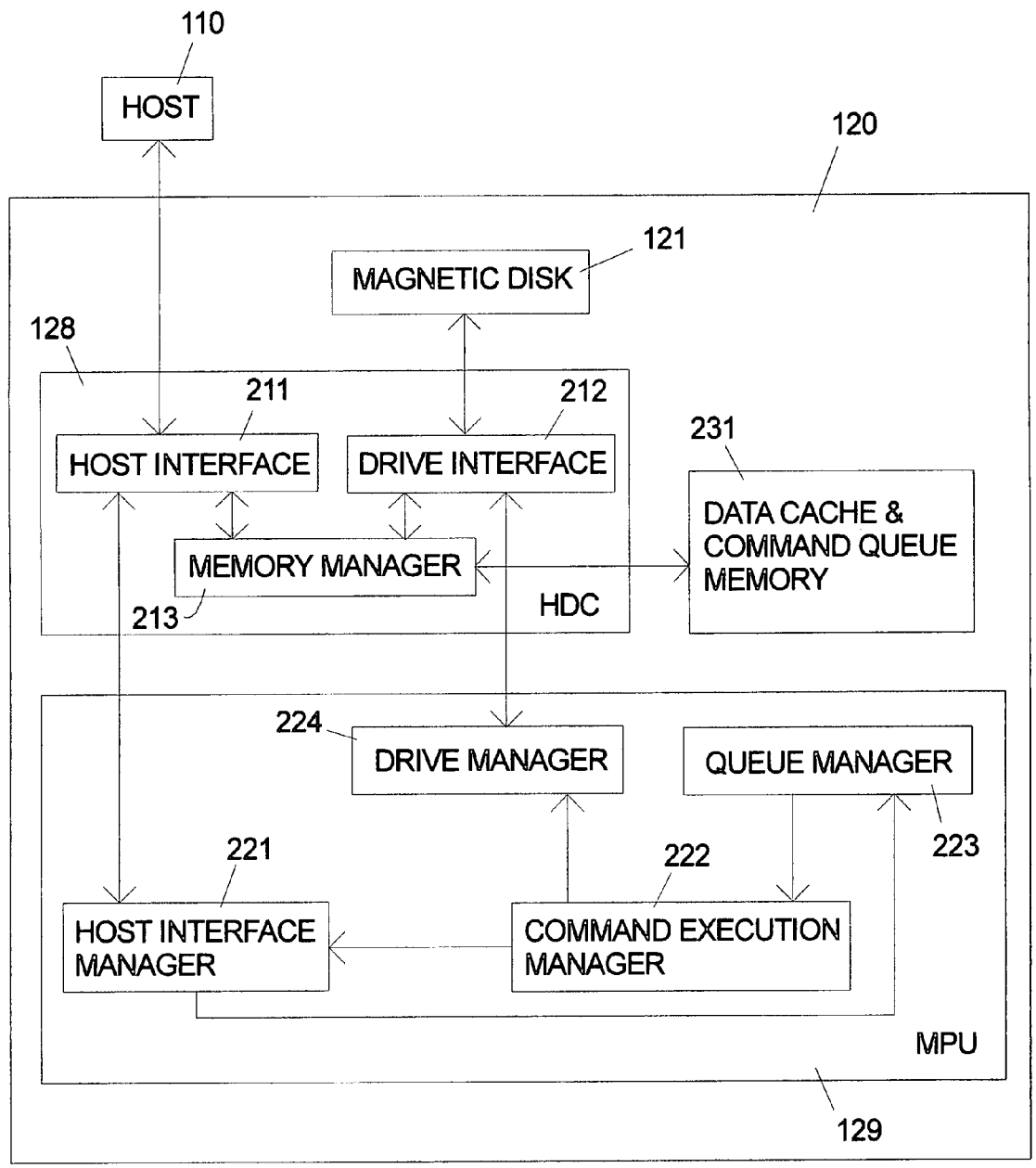
FIG. 4 is a block diagram illustrating selected components in storage device implementing an embodiment of the invention.

FIG. 4 is a block diagram illustrating selected components in storage device according to an embodiment of the invention. A description will be next made of command queuing, and a command processing method for executing a command between a host 110 and a storage device 120. The storage device 120 can control the order of execution of the commands.

The hard disk controller (HDC) 128 includes a host interface 211, a drive interface 212, and a memory manager 213. Microcode or firmware executed by the micro processor unit (MPU) 129 allow the MPU 129 to perform the function of the host interface manager 221, the command execution manager 222, the queue manager 223, and the drive manager 224. Memory component 231 is used for temporary storage of commands and data. The data cache and command queue memory 231 is used for cached read data and the command queue memory. The queue 231 holds the commands and associated data. Nonvolatile memory can be used for memory component 231. The memory for the command queue can be located external to the disk drive either on a separate component or in the host.

The host interface 211 performs actual data transfer between the host 110 and the storage device 120. The drive interface 212 performs the actual data input and output processing to the magnetic disk 121. The memory manager 213 controls the storage of data in the memory component 231. The memory manager 213 also performs intermediate processing of command and user data between the memory component 231 and other functional units in the hard disk controller 128.

The host interface manager 221 manages the host interface 211, and transmits/receives a specified notification or command to/from the host interface 211. In addition, the host interface manager 221 functions as an interface between the hard disk controller 128 and other logical units in the MPU 129. The host interface manager 221 controls the timing command completion notifications to the host 110.

The queue manager 223 classifies commands queued in the command queue 231, and determines the appropriate command execution order and implements the requirements of the write barrier architecture and the re-ordering of write commands designated as write barrier insensitive. The command execution manager 222 controls the execution of commands on the basis of the result of the classification by the queue manager 223, and the command execution order determined by the queue manager 223. By controlling the drive interface 212, the drive manager 224 controls writing/reading data to/from the magnetic disk 121. The drive manager 224 controls the drive interface 212 in response to a request from the command execution manager 222.

The foregoing description of the exemplary embodiments of the present invention has been presented for the purposes of illustration and description and are not intended to be exhaustive or to limit the scope of the present invention to the precise form disclosed. Modification, various changes, and substitutions are intended in the present invention. In some instances, features of the present invention can be employed without a corresponding use of other features as set forth. Many modifications and variations are possible in light of the above teachings, without departing from the scope of the present invention. It is intended that the scope of the present invention be limited not with this detailed description.

The invention claimed is:

1. A method of operating a data storage device comprising: placing commands received from a host in a queue; for a write command designated as write-barrier-insensitive by having a barrier sensitivity bit set by a host to designate the write command as being write-barrier-insensitive, optimizing an order of execution of the write command designated as write-barrier-insensitive without regard for write barrier commands issued by the host; and for a write command designated as write-barrier-sensitive by having a barrier sensitivity bit set by the host to designate the write command as being write-barrier-sensitive, writing data to the media only after writing data for previously received write barrier commands.

2. The method of claim 1 wherein the write command includes a Forced Unit Access bit.

3. The method of claim 1 further comprising grouping commands into Re-orderable Command Groups having boundaries defined by write barrier commands.

4. The method of claim 3 further comprising changing an order of execution of commands inside a Re-orderable Command Group to optimize performance.

5. The method of claim 1 wherein the queue is stored in non-volatile memory.

6. A data storage device comprising: memory for storing commands received from a host in a queue; means for optimizing an order in which write commands are executed; means for determining whether a write command has been designated as write-barrier-sensitive or write-barrier-insensitive by a host using a barrier sensitivity bit that is set by the host to designate the write command as being write-barrier-insensitive or write-barrier-sensitive; and means for writing data for a write barrier command in permanent storage only after writing data to media for all write commands designated as write-barrier-sensitive by a host that were received prior to the write barrier command and writing data to media for write commands designated as write barrier sensitive by the host that were received following the write barrier command after the data for the write barrier command is in permanent storage.

7. The data storage device of claim 6 wherein the means for writing data further comprises means for grouping commands into Re-orderable Command Groups having boundaries defined by the write barrier commands.

8. The data storage device of claim 7 wherein the means for writing data further comprises means for changing an order of execution of commands inside a Re-orderable Command Group to optimize performance.

9. The data storage device of claim 6 wherein the memory is non-volatile.

10. A method of operating a data storage device comprising:

placing commands received from a host in a queue; and for a write command designated as write-barrier-insensitive by a host by setting a barrier sensitivity bit to designate the write command as being write-barrier-insensitive, optimizing an order of execution of the write command designated as write-barrier-insensitive as for a read command without regard for write barrier commands issued by the host.

11. The method of claim 10 wherein the write command also includes a Forced Unit Access bit.

12. The method of claim 10 wherein the write command also includes a Write Barrier bit.

13. The method of claim 10 further comprising grouping commands into Re-orderable Command Groups having boundaries defined by write barrier commands.

14. The method of claim 13 further comprising changing an order of execution of commands inside a Re-orderable Command Group to optimize performance.

15. The method of claim 10 wherein the queue is stored in non-volatile memory.

* * * * *